US009828038B1

(12) United States Patent
Howes et al.

(10) Patent No.: US 9,828,038 B1
(45) Date of Patent: Nov. 28, 2017

(54) DEBRIS GUARD FOR USE WITH VEHICLE TRANSPORT TRAILERS

(71) Applicant: Cottrell, Inc., Gainesville, GA (US)

(72) Inventors: Phillip Bryan Howes, Braselton, GA (US); Steven Thomas Sexton, Duluth, GA (US); Lawrence Scott Moore, Lula, GA (US)

(73) Assignee: Cottrell, Inc., Gainesville, GA (US)

( * ) Notice: Subject to any disclaimer, the term of this patent is extended or adjusted under 35 U.S.C. 154(b) by 0 days.

(21) Appl. No.: 15/346,469

(22) Filed: Nov. 8, 2016

(51) Int. Cl.
*B62D 25/16* (2006.01)
*B62D 63/08* (2006.01)
*B60P 3/06* (2006.01)

(52) U.S. Cl.
CPC .............. *B62D 25/166* (2013.01); *B60P 3/06* (2013.01); *B62D 63/08* (2013.01)

(58) Field of Classification Search
CPC .. B62D 25/161; B62D 25/163; B62D 25/166; B62D 25/18; B62D 25/182; B62D 63/08; B60P 3/06
USPC ........................................ 280/507, 770, 769
See application file for complete search history.

(56) References Cited

U.S. PATENT DOCUMENTS

| | | | | |
|---|---|---|---|---|
| 1,567,777 A * | 12/1925 | Wampach | ............ | B62D 25/182 280/848 |
| 3,940,165 A * | 2/1976 | Sogoian | ............... | B62D 25/188 280/851 |
| 3,999,776 A * | 12/1976 | Betts, Sr. | ............. | B62D 25/188 248/624 |
| 4,591,178 A * | 5/1986 | Mortvedt | ............. | B62D 25/161 280/154 |
| 5,829,775 A * | 11/1998 | Maxwell | ................... | B60P 3/36 280/507 |
| 6,443,492 B1 * | 9/2002 | Barr | ..................... | B62D 25/188 280/159 |
| 8,398,150 B2 * | 3/2013 | Brown | ................. | B62D 25/168 280/851 |
| 2007/0018480 A1 * | 1/2007 | Auger | .................. | B62D 35/001 296/136.01 |
| 2008/0303259 A1 * | 12/2008 | Edwards | ................ | B60D 1/167 280/770 |

* cited by examiner

*Primary Examiner* — Frank B Vanaman

(57) ABSTRACT

A road debris system and apparatus for use with a car or vehicle transport trailer. Embodiments include a transport trailer coupled to a truck. A plurality of resistive mounting brackets are attached to the truck. Embodiments also include a plurality of cantilever rods, a first end of each of the cantilever rods attached to one of the plurality of mounting brackets. The second end of each of the plurality of cantilever rods extend away from the respective mounting bracket. A debris guard is coupled to the plurality of cantilever rods such that an edge of the debris guard distal from the mounting bracket may articulate up and down, and such that an end of the debris guard adjacent a front of the transport trailer may articulate up and down. The debris guard is dimensioned to fill a gap between a back end of the truck and the front of the transport trailer.

20 Claims, 6 Drawing Sheets

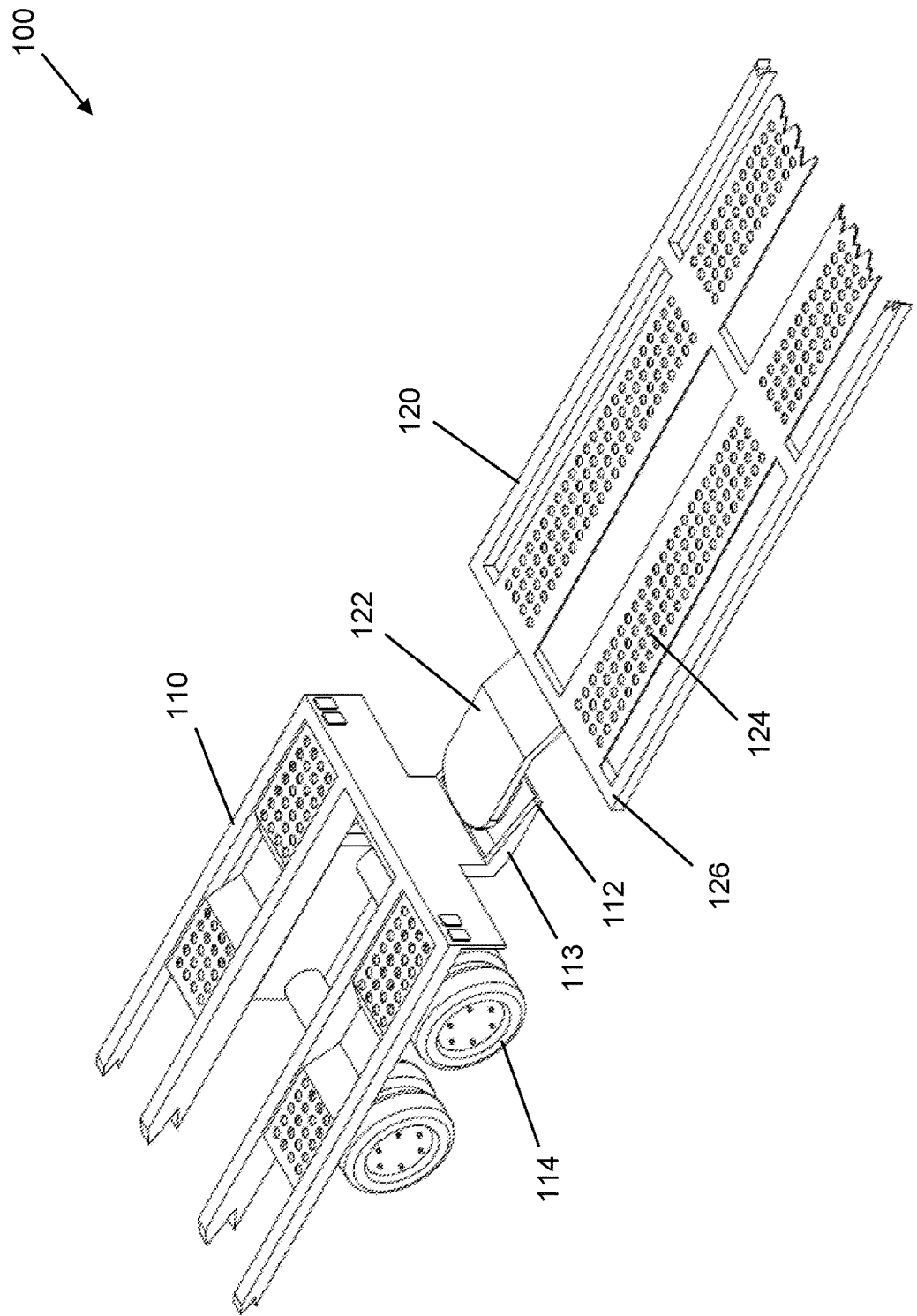

DEBRIS GUARD FOR USE WITH VEHICLE TRANSPORT TRAILERS

DESCRIPTION OF THE RELATED ART

The present invention relates generally to automobile or vehicle transport trailers and more particularly, to an improved debris guard or shield for use with such trailers. Automobiles, vehicles, cargo containers, and other cargo loads may be hauled via a transport trailer ("trailer") attached to a separate truck. Multiple cargo loads, containers, or vehicles can be transported on such a trailer. FIG. 1A illustrates a partial top perspective view of a typical car hauler system 100 that includes a trailer 120 coupled to a truck 110 via an attachment mechanism 122 of the trailer 120. When attached to the truck 110, the trailer 120 may turn independently with the attachment mechanism 122 of the trailer rotating on or within an attachment mechanism 112 of the truck 110.

When transporting vehicles, each transported vehicle typically has its own platform on the lower deck 124 of the trailer 120 onto which the vehicle is placed and secured to the trailer 120. The vehicles or other cargo on the trailer 120 are exposed to the environment. Additionally, due to the separation between the truck 110 and trailer 120 necessary for the trailer 120 to turn during normal use, vehicles or other cargo on the trailer 120 are especially subject to damage from rocks and other road debris kicked up by the tires 114 of the truck 110. Mud flaps behind the tires 114 are minimally effective in preventing such damage from rocks and other road debris.

The minimal ground clearance for such transport trailers 120 compounds the problem of road debris, and makes use of guards to deflect road debris away from vehicles on the trailer 120 difficult. For example, prior art guards to protect from road debris, such as guards 140 illustrated in FIG. 1B, have typically been small and/or featured cut-aways to avoid contact with the corners 126 of the trailer 120 when the trailer 120 is turning. Smaller guards 140 also prevent the guards 140 from contacting the road and/or prevent the guards 140 from being hung up on the underside of the trailer 120 when the trailer 120 is travelling or turning over bumps, depressions, or other uneven ground. The guards 140 illustrated in FIG. 1B are attached to the truck 110 with hinged brackets to allow the guards 140 to move vertically, and the guards 142 are supported by a spring-loaded chain 142 affixed to each guard 140. However, such small guards 140 are not effective at preventing road debris from damaging vehicles attached to the trailer 120 as the small guards 140 leave sizable gaps between the back of the truck 110 and the trailer 120 as illustrated in FIG. 1B.

Larger debris guards that minimize the gap between the back of the truck 110 and the trailer 120 have been tried. However, such large guards are cumbersome and interfere with the removal or disengagement of the trailer 120 from the truck 110. Additionally, such larger guards also interfere with the trailer 120 during operation, and are prone to hanging up either on the ground or against the underside of the trailer 120 when the trailer 120 is travelling or turning over bumps, depressions, or other uneven ground. As a result, such larger guards have mostly been abandoned in favor of smaller debris guards that minimize such interference, at the cost of less protection for the cargo or vehicles mounted on the trailer 120.

Accordingly, what is needed is an improved debris guard that overcomes the shortcomings of the previous debris shields, namely greater protection from rocks and other road debris while also not interfering with the operation of a vehicle transport trailer and/or the disengagement of the transport trailer from a truck.

SUMMARY OF THE DISCLOSURE

Improved debris guards for vehicle transport trailers are disclosed. Exemplary embodiments include a transport trailer coupled to a truck. A plurality of resistive mounting brackets are attached to the truck. A plurality of cantilever rods are provided, with a first end of each of the cantilever rods attached to one of the plurality of mounting brackets. The second end of each of the plurality of cantilever rods extend away from the respective mounting bracket(s). A debris guard is coupled to the plurality of cantilever rods such that an edge of the debris guard distal from the mounting bracket may articulate up and down, and such that an end of the debris guard adjacent the front of the transport trailer may articulate up and down, such as when the trailer is turning. The debris guard is dimensioned to fill a gap between a back end of the truck and the front of the transport trailer, providing debris protection for the transport trailer while allowing the trailer to operate unimpeded.

Other systems, apparatuses, and/or methods of using the same will be or become apparent to one with skill in the art upon review of the following drawings and detailed description. It is intended that all such additional systems, apparatuses, and/or methods of using the same be included within this description, be within the scope of the exemplary embodiments, and be protected by the accompanying claims.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 1A illustrates a partial top perspective view of a typical vehicle transport trailer attached to a truck;

DETAILED DESCRIPTION

The word "exemplary" is used herein to mean "serving as an example, instance, or illustration." Any aspect described herein as "exemplary" is not necessarily to be construed as preferred or advantageous over other aspects.

Exemplary embodiments include an improved debris guard apparatus and system that may be used with a transport trailer ("trailer") used to haul or transport cargo, such as cargo containers, vehicles, etc. The exemplary debris guard allows for full coverage of the gap between the back of a truck 110 (see FIG. 1A) and the front of the trailer 120, while also not interfering with the trailer 120 either during operation of the trailer 120 or during engagement/disengagement of the trailer 120 from the truck 110.

Figure 1B:
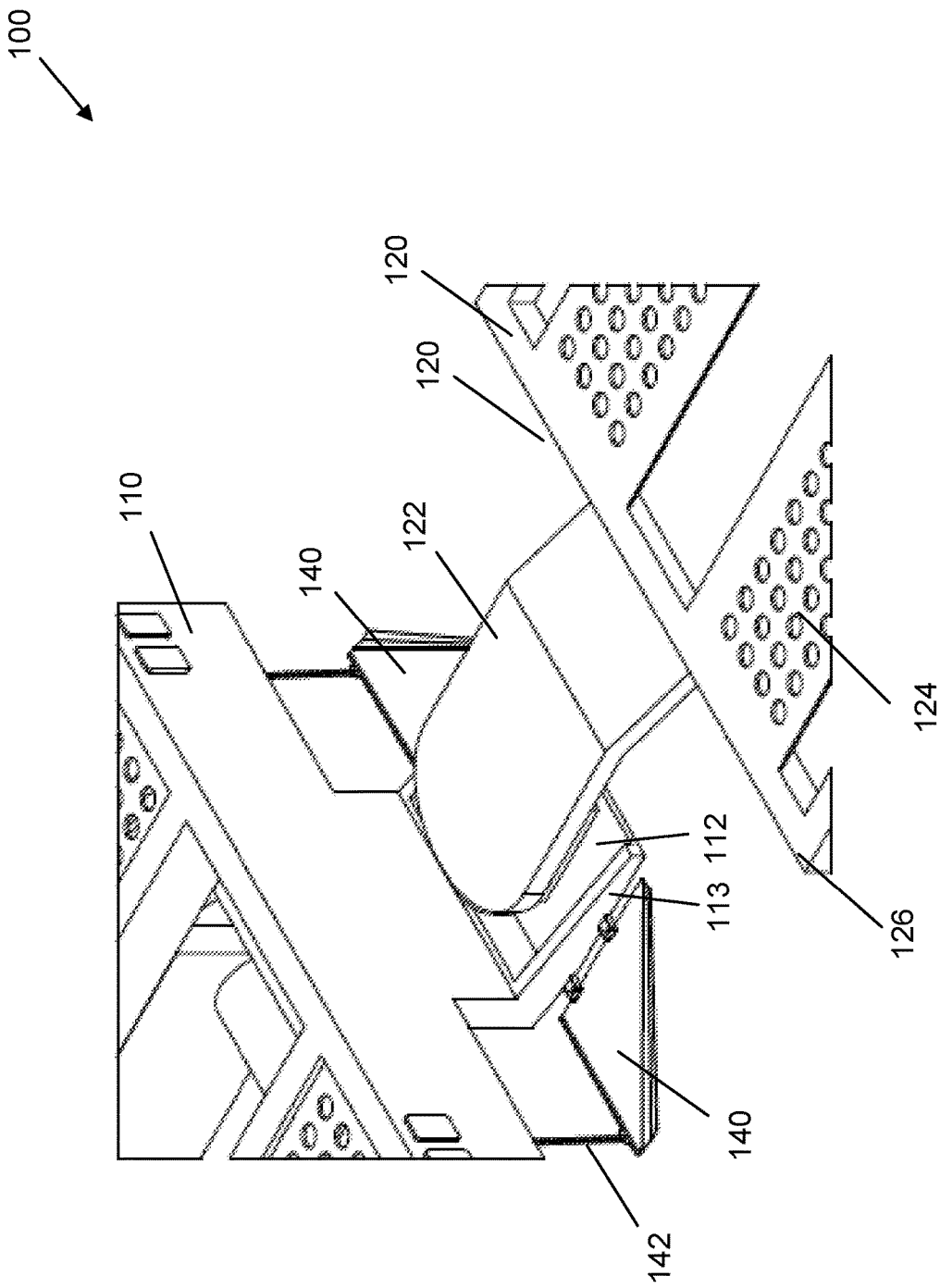
FIG. 1B illustrates a partial top perspective view of a prior art debris guard.
Figure 2:
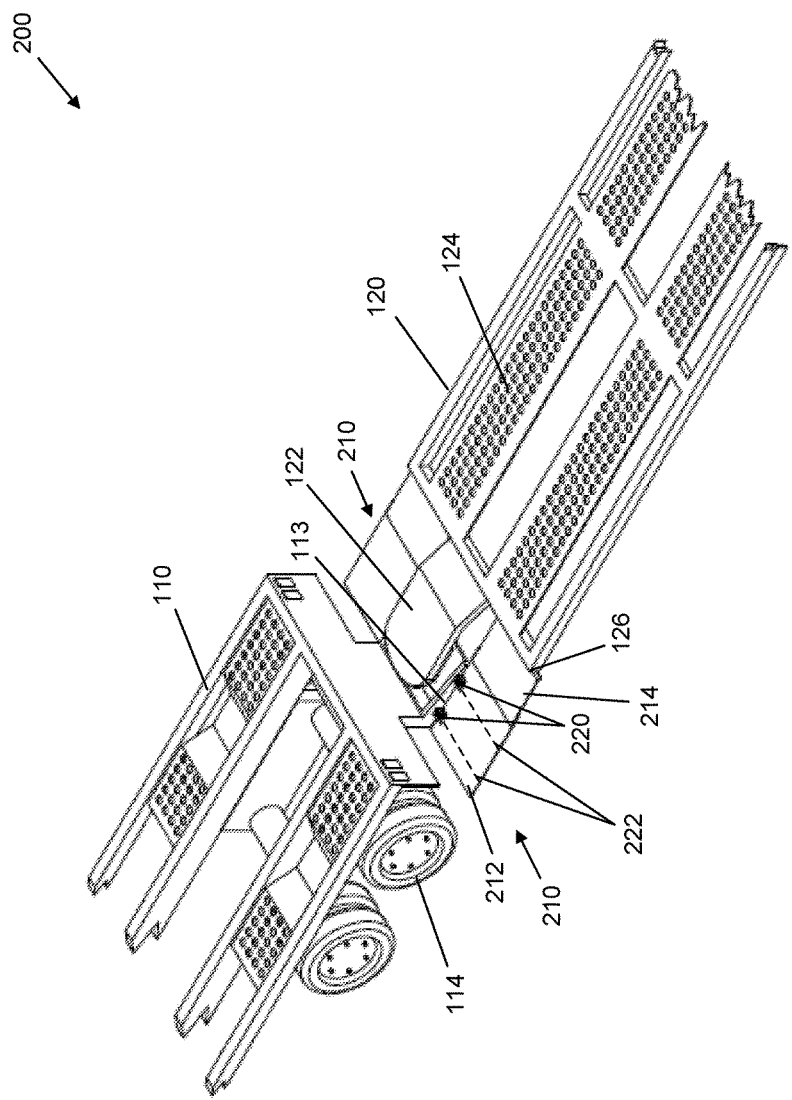
FIG. 2 illustrates is a top perspective view of aspects of an embodiment of an improved debris guard implemented on the vehicle transport trailer illustrated in FIG. 1A.

FIG. 2 illustrates is a top perspective view of aspects of an embodiment of an improved debris guard 210 implemented on the vehicle transport trailer 120 illustrated in FIG. 1A. The debris guard(s) 210 may be attached to a truck 110 towing a trailer 120. In an exemplary embodiment, two debris guards 210 may be attached to the truck 110, with one debris guard 210 located on either side of the truck attachment mechanism 112 (see FIG. 1A) used to couple the trailer 120 to the truck 110. As illustrated in FIG. 2, each debris guard 210 may be affixed to a side wall 113 of the truck attachment mechanism 112 such as with one or more mounting brackets 220.

Figure 4A:
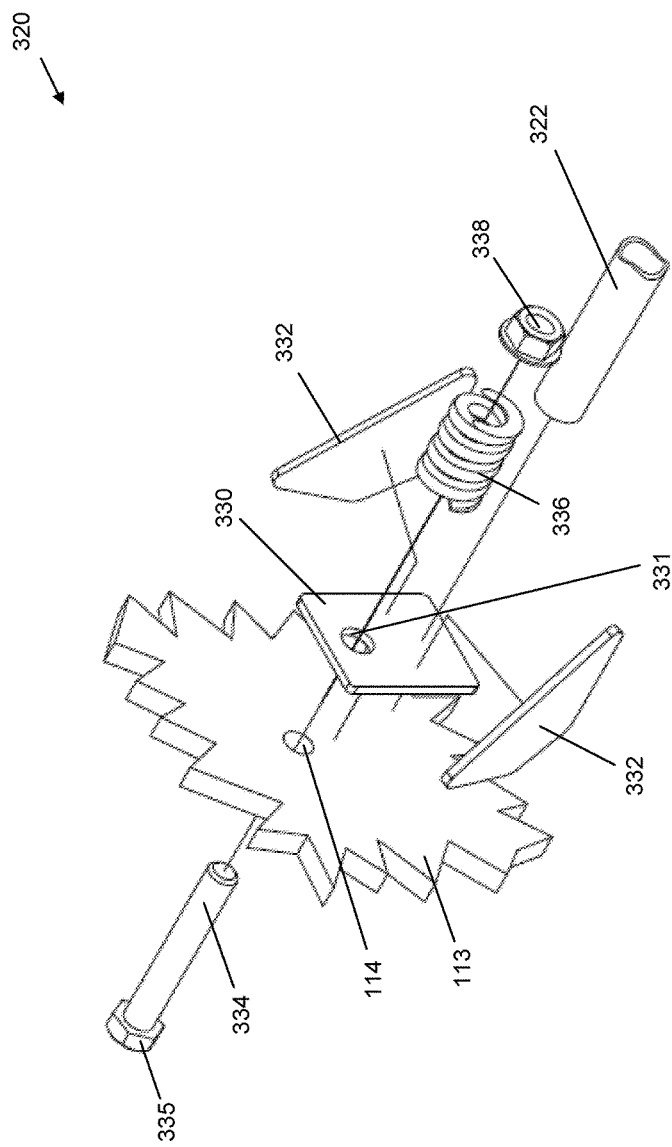
FIG. 4A illustrates an exploded perspective view of a mounting bracket for attaching the improved debris guard.
Figure 4C:
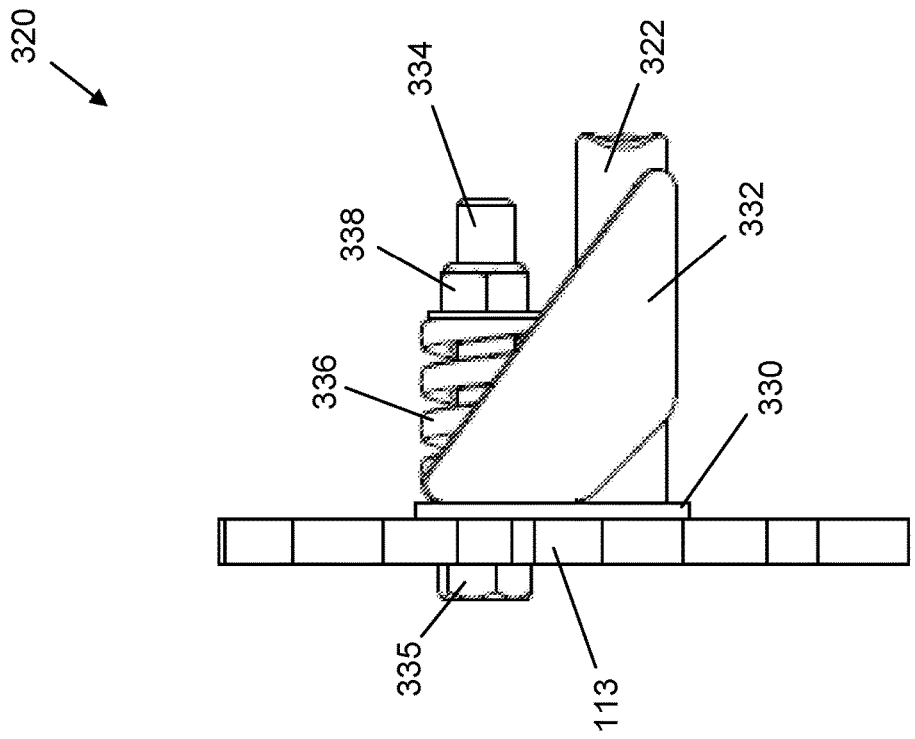
FIG. 4C illustrates a side view of the mounting bracket of FIG. 4B.
Figure 4B:
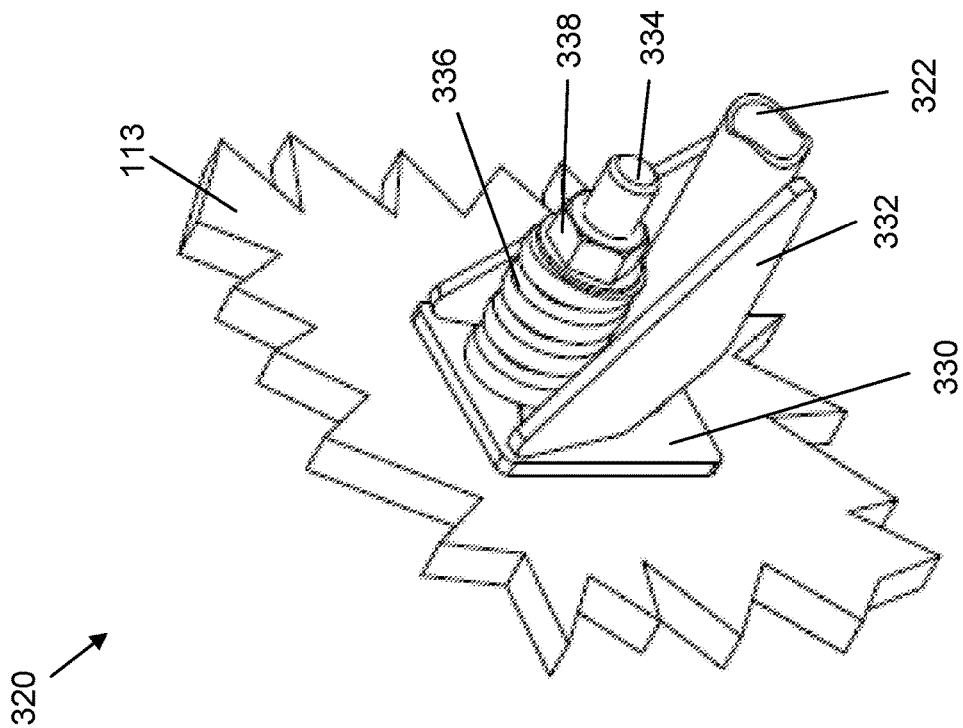
FIG. 4B illustrates a perspective view of the mounting bracket of FIG. 4A when engaged with a truck.

Each debris guard 210, or a portion of each debris guard 210 may be supported by one or more cantilever beams 222 coupled to the mounting brackets 220. As illustrated in FIGS. 4A-4C and discussed below, each mounting bracket 220 is configured to provide spring force in the direction of the supporting cantilever beam(s) 220 to allow both front-back as well as side-to-side articulation of the debris guard(s) 210. As will be understood, more or fewer than the two cantilever beams 222 illustrated in FIG. 2 may be implemented, and such beams 222 may be placed differently than illustrated in FIG. 2.

The exemplary debris guards 210 are dimensioned to provide coverage for the entire gap between the back of the truck 110 and the front of the trailer 120 to ensure that rocks and other road debris kicked up by the tires 114 of the truck 110 are directed underneath the trailer 120 rather than allowed to impact vehicles or other cargo attached to the upper surface 124 of the trailer 120. In an embodiment, the debris guards 210 may be dimensioned to the measurements of the gap between the back of the truck 110 and the front of the trailer 120. In other embodiments, the debris guard 210 may be dimensioned slightly larger than this gap and the debris guard 210 may extend underneath one or more of the truck 110 or trailer 120.

The debris guards 210 may comprise a single piece and may be made of any appropriate material such as metal or plastic. In other embodiments one or more of the debris guards 210 may be made of multiple pieces joined together. For example, in the embodiment illustrated in FIG. 2, the debris guards 210 comprise a front portion 212 that couples to the truck 110 (and is supported by the cantilever beams 222) and a second portion 214 attached to the first portion 212. In such embodiments with front and back portions 212/214, the back portion 214 may be detachable from the front portion 212 to allow the back portion 214 to be replaced as it becomes worn, without the need to replace the entire debris guard 210. Alternatively, the back portion 214 may be permanently affixed to the front portion 212, such as by glue, rivets, screws, etc., or any combination thereof.

Additionally, in embodiments like that illustrated in FIG. 2, the front portion 212 and back portion 214 need not be made of the same material and/or be the same thickness. For example, in an implementation the back portion 214 may be thinner than the front portion 212. Such a configuration, allows for a sturdier, thicker front portion 212 that is supported by the cantilever beams 222, while ensuring maximum ground clearance and/or more flexibility of the thinner back portion 214 when the back portion 214 is articulated downwards during operation of the trailer 120. Similarly, one or more of the front portion 212 or back portion 214 may be coated with a wear or scratch resistant material or coating to prevent wear of the debris guards 210 during use.

The configuration of the debris guards 210 and use of cantilever beams 222 held by resistive or spring-loaded mounting brackets 220 (see FIGS. 4A-4C) allows the debris guards 210 to provide full coverage of the gap between the back of the truck 110 and the front of the trailer 120. At the same time, the debris guards 210 do not hinder the engagement/disengagement of the trailer 120 from the truck 110— i.e. there is no need to remove or adjust the debris guards 210 when attaching the trailer 120 to the truck 110, or when removing the trailer 120 from the truck 110.

Additionally, the improved debris guards 210 self-align and articulate in both a front-to-back direction and a vertical direction during operation of the trailer 120. For example, when the trailer 120 turns, the attachment mechanism 122 of the trailer rotates on or within an attachment mechanism 112 of the truck 110 (see FIG. 1A). The corner(s) 126 of the trailer 120 pass over the upper surface of one of the debris guards 210 during such a turn, and depending on the road conditions may engage or press down on the upper surface of the debris guard 210 causing the back end of the debris guard 210 to deflect downwards (i.e. a front-to-back articulation) and/or causing the outside edge of the debris guard 210 to deflect downwards (i.e. a vertical articulation or rotation of the debris guard 210 about an defined by the side wall 113 of the truck attachment mechanism 112). Forming the debris guard 210, or the back portion 214 of the debris guard 210, from a semi-flexible material may allow for increased articulation in either direction. When the trailer 120 straightens after the turn, and the corner 126 of the trailer 120 disengages from the debris guard 210, resistive or spring-loaded mounting brackets 220 and cantilever beams 222 allow the debris guard 210 to self-align and articulate back to a level position.

Similarly, when the truck 110 or trailer 120 passes over bumps, depressions, or other uneven terrain (including when passing over such uneven terrain during a turn), the debris guards 210 can articulate upwards or downwards in both a front-to-back direction and a vertical direction to prevent the debris guards 210 from being hung up on either the truck 110 or trailer 120. Thus, the improved debris guards 210 provide enhanced protection from road debris on uneven terrain and during turns, without impairing the trailer's 120 movement.

Figure 3:
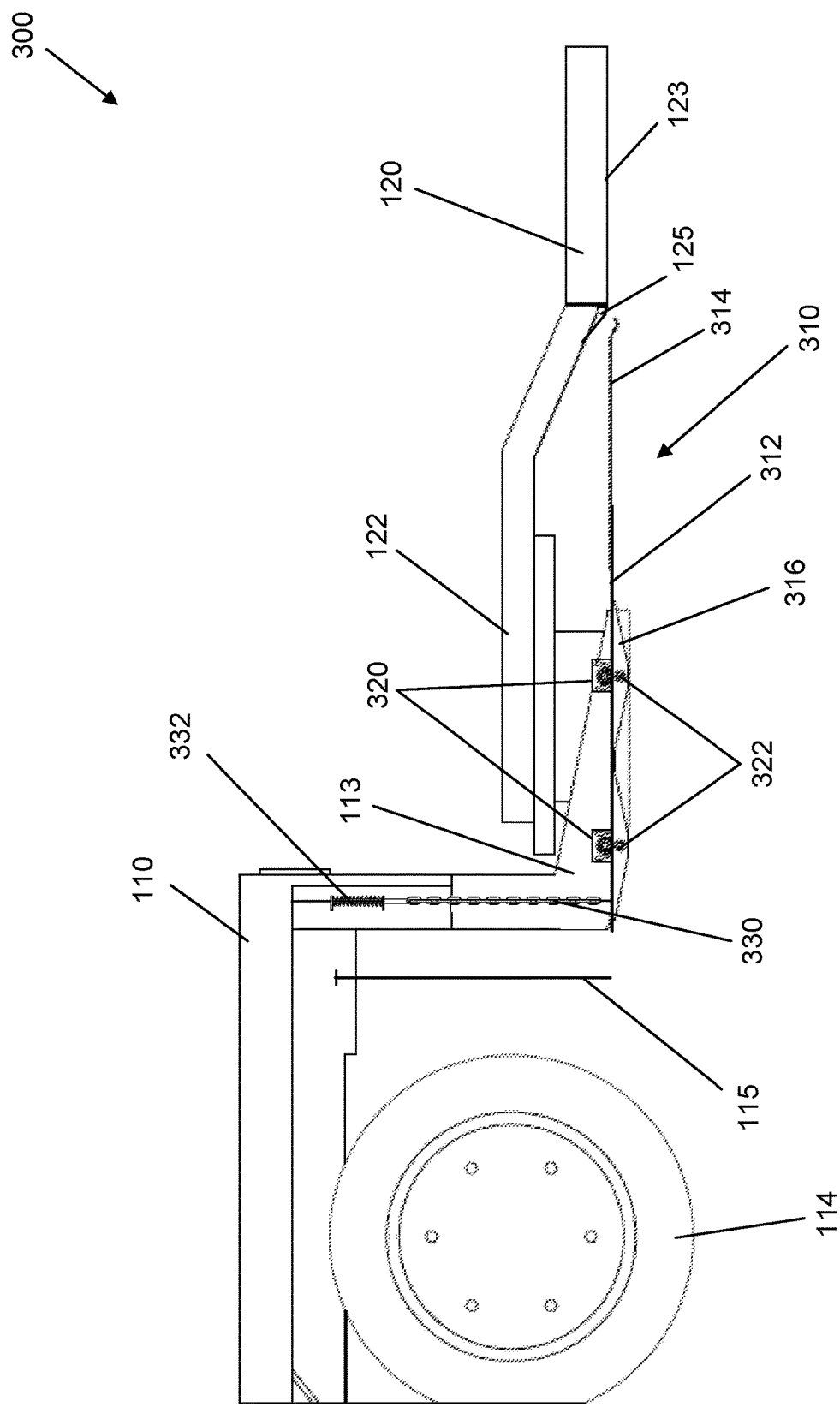
FIG. 3 illustrates a side view of an embodiment of an improved debris guard implemented on the vehicle transport trailer illustrated in FIG. 1A.

FIG. 3 illustrates a side view of an embodiment of an improved debris guard 310 implemented with a vehicle transport trailer 120 illustrated in FIG. 1A. As illustrated in FIG. 3, the debris guard 310 may be attached to a truck 110 to which the transport trailer 120 is connected in order to provide additional protection from road debris kicked up by tires 114 beyond the protection provided by mud flap 115. Like the embodiment illustrated in FIG. 2, the debris guard 310 of FIG. 3 comprises a back portion 314 attached to a front portion 312. As discussed above, the back portion 314 may be permanently or removably attached to the front portion 312 as desired.

Also like the embodiment illustrated in FIG. 2, the debris guard 310 of FIG. 3 is attached to a side wall 113 of the truck attachment mechanism 112 (see FIG. 1A) by mounting brackets 320 similar to mounting brackets 220 discussed above. The debris guard 310 is supported by cantilever beams 322 attached to the mounting brackets 320, which allow for both the front-to-back and the vertical articulation/rotation of the debris guard 310 described above. The debris guard 310 of FIG. 3 also includes a side bracket 316 that engages the end of the cantilever beams 322 and holds the cantilever beams 322 in place. The side bracket 316 may be affixed to the underside of the debris guard 310, such as the underside of the front portion 312. Additionally, in an embodiment, two smaller side brackets 316 may be used, one for each cantilever beam 322 (not illustrated), rather than a single side bracket 316 for the cantilever beams 322.

The embodiment of the debris guard 310 of FIG. 3 also includes a support chain 330. The optional support chain 330 may be attached at one end to a front end of the debris guard 310, at an outer edge of the debris guard 310. The other end of the support chain 330 may be attached to a spring 332 that is in turn attached to the truck 110. In this manner, the support chain 330 may provide additional support for the front end of the debris shield 310 during operation of the truck 110 and trailer 120. For example, the support chain 330 may provide additional support for the debris shield 310 during extreme articulation due to severely uneven terrain. Similarly, or alternatively, the support chain may provide back up support for the debris shield 310 in the event that one or more of the cantilever beams 310 or mounting brackets 320 fails during operation of the truck 110 or trailer 120.

As also illustrated in the embodiment of FIG. 3, the trailer 120 may include a guide portion 125 designed to engage an upper surface of the debris guard 310. During operation of the trailer 120, when the debris guard 310 engages with the trailer 120—such as when the trailer 120 is turning—the guide portion 125 may ensure that the back edge of the debris guard 310 does not become hung or caught on the underside 123 of the trailer 120. For example, as illustrated in FIG. 3, the guide portion 125 have a generally sloped shape, however other shapes are possible for the guide portion 125. The guide portion 125 may be useful for retro-fitting existing trailers 120 to work with debris guards 310. As will also be understood, the guide portion 125 may be located in a different position than illustrated in FIG. 3, and for example may instead be affixed to a bottom surface 123 of trailer 120.

FIGS. 4A-4C illustrate various views of a mounting bracket 220/320 for attaching the improved debris guard 210/310 to a truck 110 (see FIGS. 2-3). FIG. 4A illustrates an exploded perspective view of the mounting bracket 220/320. FIG. 4B illustrates a perspective view of the mounting bracket 220/230 engaged with the truck 110, and more specifically with a side wall 113 of the truck attachment mechanism 112 of the truck 110 (see FIGS. 1A and 3). FIG. 4 illustrates a side view of the mounting bracket 220/320 engages with the side wall 113. Although only one mounting bracket 320 is illustrated in FIGS. 4A-4C, it will be understood that each of the mounting brackets 220 illustrated in FIG. 2 or 320 illustrated in FIG. 3 may be the same as the bracket 320 illustrated in FIGS. 4A-4C. The mounting bracket 320 of FIGS. 4A-4C comprises a back plate 330 and two support plates 332 affixed to the back plate 330. The support plates 332 may be affixed to a front surface of the back plate 330 or to the sides of the back plate 330 as desired, such as by welding, glue, or any other appropriate fastening means. A first end of one of the cantilever beams 222/322 is fixed to the front surface of the back plate 330 and the support plates 332 are fixed to side surfaces of the cantilever beam 322. As illustrated in FIGS. 2-3, the other end of the cantilever beam 332 (not shown in FIGS. 4A-4C) extends outward from the mounting bracket 330 to support the debris guard 210/310.

Mounting bracket 320 of FIGS. 4A-4C is configured to attach to a side wall 113 of the truck attachment mechanism 112 of the truck 110 (see FIGS. 1A and 3). In the illustrated embodiment, mounting bracket is attached to side wall 113 via a bolt 334 that passes through a hole 114 in the side wall 113 and a hole 331 in back plate 330 of the mounting bracket 320, securing the back plate 330 to side wall 113. In other embodiments, back plate 330 may also, or instead, be glued, welded, or otherwise fastened to side wall 113. The bolt 334 of FIGS. 4A-4C is held in place by nut 338, with a resistive element 336 interposed between the back plate 330 and nut 338. The resistive element 336 may be a spring 336 as illustrated in FIGS. 4A-4C, or may in other embodiments be a different element providing a spring-like effect such as a ring or tube made of a semi-flexible material, e.g. rubber or elastomer, disposed on bolt 334. Providing a resistive element/spring 336 on each mounting bracket 320 allows each of the cantilever beam 222/322 to articulate up and down, and to articulate up and down separately from the other cantilever beam(s) 322 (see FIGS. 2-3). Additionally, the resistive element/spring 336 on each mounting bracket 320 allows each of the cantilever beams 222/322, and therefore, the debris guard 210/310 to self-adjust back to level when no force is acting on the debris guard 210/310.

The amount of articulation allowed for each cantilever beam 322 may be separately and easily adjusted as desired by tightening or losing nut 338 of the mounting bracket 320 for the respective cantilever beam(s) 222/322. Tightening nut 338 increases the tension of the resistive element/spring 336, resulting in decreased articulation and/or more force required to articulate cantilever beam 222/322. Loosening the nut 338 decreases the tension of the resistive element/spring 336, resulting in increased articulation and/or less force required to articulate cantilever beam 322. Providing multiple separately articulating cantilever beams 222/322, each with its own resistive or spring-loaded mounting bracket 320 as illustrated in FIG. 4A, allows the debris guard 210/310 to articulate side-to-side and front-to-back as discussed above for FIGS. 2 and 3. Allowing the amount of articulation for each cantilever beam 322 to be separately adjusted allows for easy control of the articulation of the debris guard 210/310 as desired for varying conditions.

While the invention has been described with reference to exemplary embodiments, it will be understood by those skilled in the art that various changes may be made and equivalents may be substituted for elements thereof without departing from the scope of the invention, including the alternate embodiments discussed above. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc., do not denote a limitation of quantity, but rather denote the presence of at least one of the referenced item. Similarly, use of the terms set, plurality, etc., also do not denote a limitation of quantity, but rather denote the presence of at least two of the reference item.

What is claimed is:

1. A debris protection system, the system comprising:
a transport trailer coupled to a truck;
a plurality of resistive mounting brackets attached to the truck;
a plurality of cantilever rods, a first end of each of the cantilever rods attached to one of the plurality of mounting brackets, the second end of each of the plurality of cantilever rods extending away from the respective mounting bracket such that the plurality of cantilever rods are substantially parallel with each other; and
a debris guard coupled to the plurality of substantially parallel cantilever rods such that an edge of the debris guard distal from the mounting bracket may articulate in a vertical direction, and such that an end of the debris guard adjacent a front of the transport trailer may also articulate in a vertical direction, wherein the debris guard is dimensioned to fill a gap between a back end of the truck and the front of the transport trailer and the debris guard is not affixed to the transport trailer.

2. The system of claim 1, wherein the debris guard comprises a front portion supported by the plurality of cantilever rods and a rear portion extending from the front portion towards the transport trailer.

3. The system of claim 2, wherein the rear portion of the debris guard is removably attached to the front portion of the debris guard.

4. The system of claim 2, wherein the rear portion of the debris guard has a thickness less than the thickness of the front portion of the debris guard.

5. The system of claim 2, wherein the debris guard further comprises a bracket extending away from a bottom surface of the front portion at the edge of the front portion distal from the resistive mounting bracket, the bracket configured to receive the second end of the plurality of cantilever rods.

6. The system of claim 1, wherein each of the plurality of resistive mounting brackets comprises:
a back plate attached to the truck by a bolt extending through the back plate, the first end of each of the cantilever rods attached to one of the back plates,
a nut attached to an end of the bolt, and
a resistive element disposed between the nut and the back plate.

7. The system of claim 6, wherein nut is adjustable to increase or decrease a tension on the resistive element.

8. The system of claim 7, wherein the resistive element comprises a spring.

9. The system of claim 1, further comprising a guide portion affixed to the trailer, the guide portion configured to engage a top surface of the debris guard when the trailer is turning.

10. The system of claim 1, further comprising a support chain, a first end of the support chain affixed to the debris guard and a second end of the support chain affixed to a first end of a spring, wherein the second end of the spring is affixed to the truck.

11. A debris protection apparatus for use with a transport trailer, the apparatus comprising:
a plurality of resistive mounting brackets;
a plurality of cantilever rods, a first end of each of the cantilever rods attached to one of the plurality of mounting brackets, the second end of each of the plurality of cantilever rods extending away from the respective mounting bracket such that the plurality of cantilever rods are substantially parallel with each other; and
a debris guard coupled to the plurality of substantially parallel cantilever rods such that an edge of the debris guard distal from the mounting bracket may articulate in a vertical direction, and such that an end of the debris guard adjacent a front of the transport trailer may also articulate in a vertical direction wherein the debris guard is not affixed to the transport trailer.

12. The apparatus of claim 11, wherein the debris guard comprises a front portion supported by the plurality of cantilever rods and a rear portion extending from the front portion towards the transport trailer.

13. The apparatus of claim 12, wherein the rear portion of the debris guard is removably attached to the front portion of the debris guard.

14. The apparatus of claim 12, wherein the rear portion of the debris guard has a thickness less than the thickness of the front portion of the debris guard.

15. The apparatus of claim 12, wherein the debris guard further comprises a bracket extending away from a bottom surface of the front portion adjacent to the edge of the front portion distal from the resistive mounting bracket, the bracket configured to receive the second end of the plurality of cantilever rods.

16. The apparatus of claim 11, wherein each of the plurality of resistive mounting brackets comprises:
a back plate attached to a vehicle towing the transport trailer by a bolt extending through the back plate, the first end of each of the cantilever rods attached to one of the back plates,
a nut attached to an end of the bolt, and
a resistive element disposed between the nut and the back plate.

17. The apparatus of claim 16, wherein nut is adjustable to increase or decrease a tension on the resistive element.

18. The apparatus of claim 17, wherein the resistive element comprises a spring.

19. The apparatus of claim 11, further comprising a guide portion configured to be affixed to the transport trailer, the guide portion configured to engage a top surface of the debris guard when the trailer is turning.

20. The apparatus of claim 11, further comprising a support chain, a first end of the support chain affixed to the debris guard and a second end of the support chain affixed to a first end of a spring.

* * * * *